United States Patent [19]
Scribner et al.

[11] Patent Number: 5,593,653
[45] Date of Patent: *Jan. 14, 1997

[54] METATHESIS OF ACIDIC BY-PRODUCT OF CHLORINE DIOXIDE GENERATING PROCESS

[75] Inventors: Herbert C. Scribner, Monroe, La.; Maurice C. J. Fredette, Mississauga; Edward J. Bechberger, Etobicoke; Chunmin Pu, Mississauga, all of Canada

[73] Assignee: Sterling Canada, Inc., Houston, Tex.

[*] Notice: The term of this patent shall not extend beyond the expiration date of Pat. No. 5,116,595.

[21] Appl. No.: 294,604

[22] Filed: Aug. 23, 1994

Related U.S. Application Data

[63] Continuation of Ser. No. 973,760, Nov. 9, 1992, abandoned.

[51] Int. Cl.$^6$ ............... C01D 5/00; C01B 11/02
[52] U.S. Cl. ............ 423/477; 423/478; 423/479; 423/551
[58] Field of Search ............... 423/477, 478, 423/479, 552, 551

[56] References Cited

U.S. PATENT DOCUMENTS

| | | | |
|---|---|---|---|
| 3,789,108 | 1/1974 | Rapson | 423/478 |
| 3,793,439 | 2/1974 | Rapson | 423/478 |
| 3,864,456 | 2/1975 | Winfield et al. | 423/478 |
| 3,975,505 | 8/1976 | Fuller | 423/478 |
| 4,081,520 | 3/1978 | Swindells et al. | 423/478 |
| 4,325,934 | 4/1982 | Swindells et al. | 423/478 |
| 4,406,736 | 9/1983 | Reeve | 162/88 |
| 4,806,215 | 2/1989 | Twardowski | 204/98 |
| 4,931,268 | 6/1990 | Fredette et al. | 423/479 |
| 4,938,943 | 7/1990 | Norell | 423/478 |
| 4,961,918 | 10/1990 | Norell et al. | 423/479 |
| 4,978,517 | 12/1990 | Norell et al. | 423/479 |
| 5,066,477 | 11/1991 | Zell et al. | 423/479 |
| 5,091,166 | 2/1992 | Engstrom et al. | 423/478 |
| 5,091,167 | 2/1992 | Engstrom et al. | 423/478 |
| 5,116,595 | 5/1992 | Scribner et al. | 423/477 |
| 5,122,240 | 6/1992 | Cowley et al. | 204/101 |
| 5,198,080 | 3/1993 | Cowley et al. | 204/101 |
| 5,205,995 | 4/1993 | Scribner et al. | 422/189 |
| 5,366,714 | 11/1994 | Bigauskas | 423/478 |
| 5,378,447 | 1/1995 | Jackson et al. | 423/475 |
| 5,399,332 | 3/1995 | Pu | 423/478 |

FOREIGN PATENT DOCUMENTS

| | | | |
|---|---|---|---|
| 0956784 | 10/1974 | Canada | 423/477 |
| 1118184 | 2/1982 | Canada . | |
| 2490206 | 3/1982 | France | 423/478 |
| 2569677 | 3/1986 | France | 423/479 |

*Primary Examiner*—Gary P. Straub
*Assistant Examiner*—Timothy C. Vanoy
*Attorney, Agent, or Firm*—Sim & McBurney

[57] ABSTRACT

Sodium sesquisulfate produced in crystalline form in a high acidity highly efficient chlorine dioxide generating process is converted by metathesis to crystalline anhydrous neutral sodium sulfate and the acid recovered as a result is recycled to the chlorine dioxide generating step. The metathesis is effected by contacting the crystalline sodium sesquisulfate with aqueous sodium chlorate solution, aqueous sodium chloride solution, aqueous methanol or water alone. The metathesis is effected in such manner as to minimize the additional evaporative load imposed on the chlorine dioxide generating process by the metathesis medium.

75 Claims, 5 Drawing Sheets

Fig.4: Metathesis of Na3H(SO4)2 Maximum Acidity vs. Temp.

METATHESIS OF ACIDIC BY-PRODUCT OF CHLORINE DIOXIDE GENERATING PROCESS

REFERENCE TO RELATED APPLICATION

This is a continuation of application Ser. No. 973,760 filed Nov. 9, 1992 now abandoned.

This application is a continuation-in-part of copending United States patent application Ser. No. 844,231 filed Mar. 2, 1992, which itself is division of U.S. patent application Ser. No. 688,438 filed Apr. 22, 1991 (now U.S. Pat. No. 5,116,595).

FIELD OF INVENTION

The present invention relates to the production of chlorine dioxide and the processing of acidic by-products of such production.

BACKGROUND TO THE INVENTION

In U.S. Pat. No. 4,081,520, assigned to the assignee hereof and the disclosure of which is incorporated herein by reference, there is described a process for the production of chlorine dioxide at high efficiency using sodium chlorate, sulfuric acid and methanol. The reaction medium from which the chlorine dioxide is formed is maintained at its boiling point, generally in the range of about 50° to about 85° C., under a subatmospheric pressure. The evaporated water serves to dilute the chlorine dioxide for removal from the reaction zone.

The mechanism of reaction is thought to be that chlorine, coproduced with the chlorine dioxide, is reduced by the methanol to chloride ions, which then react with the sodium chlorate. The reaction medium generally has a total acid normality greater than about 4.5 normal, which results in the formation of a sodium acid sulfate, usually sodium. sesquisulfate, which precipitates from the reaction medium, after becoming saturated with the salt following start-up. The process equation may be represented as:

$$3NaClO_3 + 2H_2SO_4 + 0.85CH_3OH \rightarrow 3ClO_2 + Na_3H(SO_4)_2 + H_2O + 0.05CH_3OH + 0.6HCOOH + 0.2CO_2$$

This process is highly efficient in terms of the conversion of chlorate ions to chlorine dioxide and efficiencies well in excess of 90% can be achieved. The chlorine dioxide which results is virtually uncontaminated by chlorine, which is highly beneficial in the modern pulp mill environment. The process described in U.S. Pat. No. 4,081,520 has been widely adopted commercially and is known as the "R8" process.

As noted above, the by-product of this process is a sodium acid sulfate. This material may be used, as is, in the pulp mill as a make-up chemical for sulfur values lost from the mill. However, with the considerable tightening of the pulp mill environment in recent years, such sulfur losses have been significantly decreased, so that the requirement for make-up sodium sulfate also has declined to the stage where the material is an unwanted by-product.

It has recently been suggested in U.S. Pat. Nos. 5,091,166 and 5,091,167, to effect such chlorine dioxide generation by reduction with hydrogen peroxide rather than methanol. At acid normalities of 5 and above, as described in U.S. Pat. No. 5,091,167, a sodium acid sulfate is formed as the by-product of the chlorine dioxide generating process.

Owing to the acidic nature of the by-product, sodium sesquisulfate cannot readily be disposed of in that form, requiring neutralization of the acid values prior to disposal. With the trend towards higher chlorine dioxide substitution for chlorine in many mills, the necessity to neutralize increasing quantities of sodium sesquisulfate may result in an imbalance of caustic and chlorine within the mill. The caustic demand increases while chlorine usage declines, resulting in increased costs to the mills. In addition, the lost acid values of the sodium sesquisulfate require that make-up sulfuric acid must be fed continuously to the chlorine dioxide generator to maintain the required acidity.

There have been prior suggestions to alleviate this problem in the R8 process and also in other chlorine dioxide generating processes which produce an acid sulfate by-product. For example, in U.S. Pat. No. 3,975,505 there is described the treatment of acid sulfate produced in a high acidity process for generating chlorine dioxide from sodium chlorate, sodium chloride and sulfuric acid, by passing crystalline by-product from the chlorine dioxide generator countercurrent to warm wash water in a washing column, which has the effect of not only freeing the crystalline material of entrained reaction medium but also converting the sodium acid sulfate to neutral sodium sulfate.

U.S. Pat. No. 4,325,934, assigned to the assignee hereof, describes contacting the solid phase by-product sodium acid sulfate from an R8 chlorine dioxide generator with a mixture of water and methanol to produce solid phase neutral sodium sulfate. This prior art reference describes the preferred use of weight ratios of water to sodium acid sulfate (calculated as $Na_3H(SO_4)_2$) of about 0.6:1 to about 0.8:1 and of methanol to sodium acid sulfate (calculated as $Na_3H(SO_4)_2$) of about 0.3:1 to about 0.8:1. Acid values recovered by this process are recycled to the chlorine dioxide generator, while excess methanol is stripped from the acidic solution.

Canadian Patent No. 1,118,184 granted to the assignee hereof, describes a procedure in which the solid phase by-product from the R8 process is contacted with warm water to effect conversion of by-product sodium sesquisulfate to neutral sodium sulfate in a multi-stage decantation-washing operation.

None of these procedures has proved to be commercially attractive, for a variety of reasons. The procedure described in U.S. Pat. No. 3,975,505 refers to a different process for forming chlorine dioxide, i.e. sodium chloride is added to provide the reducing agent, as well as significantly increasing the evaporative load on the generator, U.S. Pat. No. 4,325,934 requires a costly stripping operation with respect to the excess of methanol employed and the equipment described in Canadian Patent No. 1,118,184 has been found to plug frequently and to add approximately three to four tonnes of water per tonne of chlorine dioxide generated to the evaporative load of the generator.

SUMMARY OF INVENTION

The present invention provides an improved procedure to effect metathesis of solid phase sodium sesquisulfate from a chlorine dioxide generating process using a reducing agent which is believed to produce chloride ions in situ from coproduced chlorine to recover acid values therefrom for reuse in the chlorine dioxide generating process and to convert the sodium sesquisulfate to neutral anhydrous sodium sulfate, while, at the same time, avoiding significantly increasing the evaporative load on the chlorine dioxide generator and avoiding the necessity to strip off excess methanol. In this way, the problems of the prior art procedures described above are overcome by the present invention.

In one aspect of the invention, there is provided a process for the conversion of sodium sesquisulfate to neutral anhydrous sodium sulfate, which comprises contacting the sodium sesquisulfate in solid crystalline form with an aqueous medium for a time and at a temperature at least sufficient to effect conversion of the solid crystalline sodium sesquisulfate to neutral anhydrous sodium sulfate, at least partially in solid crystalline form, and to form an aqueous acid-containing medium having a total acid normality of up to about 6.5 normal.

Accordingly, in the present invention, an aqueous medium is employed to effect metathesis of the sodium sesquisulfate to neutral anhydrous sodium sulfate. The sulfuric acid solution which results may be forwarded to the chlorine dioxide generator producing the sodium sesquisulfate to provide acid values thereto.

The present invention comprises three embodiments of metathesis procedure, involving the use of water alone, the use of aqueous solutions of sodium chlorate or sodium chloride and the use of aqueous solutions of methanol. In each embodiment, the process conditions utilized result in an increased evaporative load on the chlorine dioxide generator, generally no more than about 2 tonnes of water per tonne of chlorine dioxide generated, hence overcoming the problem of the significantly increased evaporative load imposed by the column-type metathesis equipment described in the aforementioned U.S. Pat. No. 3,975,505 and Canadian Patent No. 1,118,184.

In each of the embodiments of the present invention, there is employed a metathesis procedure in which sodium sesquisulfate removed from a chlorine dioxide generator with entrained aqueous acid reaction medium is filtered and may be washed free from such entrained medium, the resulting solid phase sodium sesquisulphate is contacted with the metathesis medium in one or more stirred tanks, and the resulting slurry of neutral anhydrous sodium sulfate is filtered to recover the solid phase. The acid values contained in the filtrate then may be used in the chlorine dioxide generating process which produced the sodium acid sulfate.

In a first aspect of the present invention, therefore, there is provided a process for the conversion of sodium sesquisulfate to neutral anhydrous sodium sulfate, which comprises contacting the sodium sesquisulfate in solid crystalline form with an aqueous medium containing from about 0.01 to about 7 molar sodium chlorate for a time and at a temperature at least sufficient to effect conversion of the solid crystalline sodium sesquisulfate to neutral anhydrous sodium sulfate at least partially in solid crystalline form and to form an aqueous acid-containing medium having a total acid normality of up to about 6.5 normal. This first aspect of the invention, therefore, relates to the employment of an aqueous solution of sodium chlorate as the metathesis medium.

In this aspect of the present invention, the sodium chlorate solution may be replaced by another sodium salt to provide the common ion effect achieved thereby, such as sodium chloride. In this latter embodiment, the aqueous medium contacting the crystalline sodium sesquisulfate containing from about 0.01 to about 5 molar sodium chloride, preferably about 2 to about 4 molar sodium chloride.

In a second aspect of the present invention, there is provided a process for the conversion of sodium sesquisulfate to neutral anhydrous sodium sulfate, which comprises contacting the sodium sesquisulfate in solid crystalline form with an aqueous medium containing up to about 0.15 tonnes of methanol per tonne of chlorine dioxide produced for a time and at a temperature at least sufficient to effect conversion of the solid crystalline sodium sesquisulfate to neutral anhydrous sodium sulfate at least partially in solid crystalline form and to form an aqueous acid-containing medium having a total acid normality of up to about 6.5 normal. This second aspect of the invention, therefore, relates to the employment of an aqueous solution of methanol as the metathesis medium.

In a third aspect of the present invention, there is provided a process for the conversion of a slurry of sodium sesquisulfate having entrained reaction medium from a chlorine dioxide generating process associated therewith to neutral anhydrous sodium sulfate, which comprises feeding the slurry to a first filter means wherein solid crystalline sodium sesquisulfate is separated from entrained reaction medium and may be contacted with wash water to remove residual entrained reaction medium, contacting the separated solid crystalline sodium sesquisulfate with water in a mixing tank for a time and at a temperature at least sufficient to effect conversion of the solid crystalline sodium sesquisulfate to neutral anhydrous sodium sulfate at least partially in solid crystalline form and to form an aqueous acid-containing medium having a total acid normality of up to about 6.5 normal, and separating the solid phase crystalline neutral anhydrous sodium sulfate from the aqueous acid-containing medium by filtration on a second filter means. Part of the aqueous acid medium may be recycled to the first filter means to constitute wash water used therein. This third aspect of the invention, therefore, relates to the employment of water alone as the metathesis medium.

In another aspect of the present invention, there is provided a process for the production of chlorine dioxide, which comprises reacting chlorate ions and a reducing agent for coproduced chlorine in an aqueous acid reaction medium having a total acid normality of at least about 4 normal, usually about 5 to about 11 normal, and containing sulfuric acid to form chlorine dioxide in a reaction zone from the aqueous acid reaction medium; maintaining the aqueous acid reaction medium at its boiling point under a subatmospheric pressure applied to the reaction zone and precipitating a by-product acid sulfate in the reaction zone from the aqueous reaction medium; removing the precipitated by-product acid sulfate from the reaction zone; contacting the removed by-product acid sulfate in the solid phase with an aqueous medium selected from the group consisting of water, aqueous sodium chlorate solution, aqueous sodium chloride solution and aqueous methanol solution, in accordance with the procedures of the three aspects of the invention described above, to effect conversion of the solid phase by-product acid sulfate into solid phase neutral anhydrous sulfate and to form an aqueous acid medium having a total acid normality up to about 6.5 normal; separating the solid phase neutral anhydrous sulfate from the aqueous acid medium; and, optionally, recycling the aqueous acid medium to the reaction zone.

Essential to the present invention is conversion of crystalline sodium sesquisulfate, or other acid sulfate, produced by a high acidity methanol-based or hydrogen peroxide-based chlorine dioxide generating process effected in a single vessel generator-evaporator-crystallizer, to solid phase neutral anhydrous form to recover acid values from the sodium sesquisulfate for reutilization in the chlorine dioxide generating process.

The metathesis of sodium sesquisulfate may be represented by the following general equation:

$$2Na_3H(SO_4)_2 + \text{water} \rightarrow 6\,Na^+ + 2H^+ + 4SO_4^= \rightarrow$$

$$\frac{2Na^+ + 2H^+ + 2SO_4^=}{\text{in Solution}} + \frac{2Na_2SO_4}{\text{Solid}}$$

The reaction is driven by precipitation of less soluble $Na_2SO_4$, which removes $Na^+$ and $SO_4^=$ ions from solution and permits more sodium sesquisulfate to dissolve. In the embodiment where aqueous sodium chlorate or sodium chloride is used, additional $Na^+$ ions from the $NaClO_3$ or $NaCl$ depresses the $Na_2SO_4$ solubility. Similarly, in the embodiment where aqueous methanol is used, the presence of the methanol depresses $Na_2SO_4$ solubility.

It is advantageous to employ solutions of sodium chlorate to effect the metathesis in comparison to water alone, since the common sodium ion depresses the solubility of neutral anhydrous sodium sulfate, thereby increasing the yield of this product. In addition, the same water is used for conveying sodium chlorate to the generator and to effect metathesis, thereby maintaining the additional evaporative load on the generator below about 1 tonne per tonne of chlorine dioxide.

Similarly, it is advantageous to employ solutions of sodium chloride to effect metathesis in comparison to water alone, since an increased yield of anhydrous sodium sulfate results from the common ion effect. In this embodiment, the acidified aqueous phase by-product from such metathesis is useful for pH control in the bleach plant of the pulp mill and is not normally recycled to the chlorine dioxide generator.

The by-product neutral sodium sulfate produced by the process of the invention may be employed to make-up pulp mill sulfur losses. Some or all of the sodium sulfate also may be used in the electrochemical acidification process described in copending U.S. patent application Ser. No. 535,165 (E437) (now U.S. Pat. No. 5,122,240) and copending U.S. patent application Ser. No. 687,741 filed Apr. 19, 1991, assigned to the assignee hereof and the disclosures of which are incorporated herein by reference.

Such acidification can be achieved, for example, in an electrolytic process involving a two-compartment cell equipped with a cation-exchange membrane separating the anodic compartment, where the acidification takes place, from the cathodic compartment, where hydroxyl ions are produced. Alternatively, a three-compartment cell equipped with two cation-exchange membranes can be used whereby a neutral sulfate solution is circulated in the centre compartment and/or is employed for the preparation of the anolyte.

Another possibility is to employ an electrodialytic process utilizing bipolar membranes in which the solution containing neutral sulfate or its mixtures with chlorate or mixtures with chlorate and sesquisulfate is processed in a plurality of unit cells, with each unit cell being separated from the adjacent ones by bipolar membranes. The bipolar membranes have an anionic face in the base compartment of one cell and a cationic face in the acid compartment of an adjacent cell. The individual cells are divided by at least one cation-exchange membrane. If a complete conversion of sodium sulfate to sulfuric acid and sodium hydroxide is required, then a plurality of three-compartment unit cells is employed with sodium sulfate being fed to the centre compartment which is separated from the base and acid compartments by cation- and anion-exchange membranes, respectively. Using a neutral saltcake resulting from the metathesis process of the invention in such acidification processes is advantageous not only because it improves the current efficiency due to the increased $[Na^+]/[H^+]$ ratio (as disclosed in the aforementioned copending applications), but also because it gives an opportunity to minimize the hardness content in the saltcake used in the acidification process. Minimization of the hardness has a beneficial effect on the cell performance (i.e. current efficiency) and, in addition, it prolongs the life of the membranes used in the acidification process (both cation-exchange and bipolar). The removal of hardness from sesquisulfate or acid sulfate is a complex and costly process which typically requires an initial neutralization of the saltcake with caustic. By employing metathesis, in accordance with the present invention, one can not only recover the acid values from the saltcake but also minimize the cost involved in adding sodium hydroxide to sesquisulfate (acid sulfate) in order to precipitate ions responsible for the hardness (generally $Ca^{2+}$, $Mg^{2+}$, $Fe^{2+}$, $Fe^{3+}$ etc.)

In our parent application Ser. No. 688,438 (now U.S. Pat. No. 5,116,595), there are described metathesis processes which produce neutral anhydrous sodium sulfate and an aqueous acid-containing medium having a total acid normality of up to about 4.8 normal. Conventional wisdom of the art is that neutral anhydrous sodium sulfate is not found at acid normalities above about 4.8 normal.

It now has been surprisingly found that, under conditions of much longer residence times (i.e. of the order of 2 to 4 hours compared to a few minutes) and/or higher temperatures, solid neutral anhydrous sodium sulfate can still be obtained by metathesis of the acid salt at acid normalities of aqueous acid-containing solution greater than 4.8N and up to about 6.5N. In accordance with an additional aspect of the present invention, therefore, there is provided a process for the conversion of sodium sesquisulfate to neutral anhydrous sodium sulfate, which comprises contacting the sodium sesquisulfate in solid form with an aqueous metathesizing medium for a time and at a temperature at least sufficient to effect conversion of the solid crystalline sodium sesquisulfate to neutral anhydrous sodium sulfate at least partially in solid crystalline form and to form an aqueous acid-containing medium having a total acid normality greater than about 4.8 normal, particularly up to about 6.5 normal.

Such a process may employ the aqueous sodium chlorate solution, aqueous sodium chloride solution or aqueous methanol solution described above for the metathesizing medium. One preferred metathesizing medium is water.

The ability to provide an aqueous acid-containing solution at a higher acid normality leads to several benefits, in comparison to operation at below about 4.8N. One benefit resides in the use of a lower ratio of water to sodium sesquisulfate than previously, with the minimum such ratio falling from 0.5:1 to about 0.25:1.

In turn, this decreased water requirement and higher acid content result in a decreased evaporative load on the chlorine dioxide generator and a decrease in the quantity of dead-load sodium sulfate being returned to the chlorine dioxide generator to reappear as sodium sesquisulfate in the chlorine dioxide generator precipitate, when the metathesis process is integrated with a chlorine dioxide generating process.

A further decrease in the water load can be achieved by using the filter-cloth wash water das one of the water sources for the metathesizing medium.

GENERAL DESCRIPTION OF INVENTION

The sodium sesquisulfate, or other acid sulfate, which is metathesized in accordance with the invention is recovered in crystalline form from a chlorine dioxide generating operation in which the reducing agent is one which is believed to reduce coproduced chlorine to chloride ions. Such process is described hereinafter with respect to methanol being the reducing agent. The process also is applicable to employment of hydrogen peroxide as the reducing agent. The chlorine dioxide generating operation is generally one in which sodium chlorate is reacted with the reducing agent, preferably methanol or hydrogen peroxide, in an aqueous acid reaction medium comprising sulfuric acid and having an acid normality of at least about 4 normal, generally from about 5 to about 11 normal, which is maintained at its boiling point under a subatmospheric pressure.

The crystalline sodium sesquisulfate is removed from the reaction zone as a slurry in spent reaction medium and usually is filtered to remove entrained reaction medium, which is returned to the reaction zone. The crystalline sodium sesquisulfate then is contacted with an aqueous medium, in one embodiment containing sodium chlorate in a concentration of about 0.01 to about 7 molar, preferably about 2 to about 4 molar. As noted above, aqueous sodium chloride solution may be employed in place of the sodium chlorate.

The contact of the sodium sesquisulfate by the aqueous medium in this and the other embodiments of the invention is effected at a temperature of at least about 30° C., preferably about 40° to about 100° C., to ensure the production of neutral anhydrous sodium sulfate, which is much more easily handled than the hydrated form. Temperatures higher than 100° C. are possible but a condenser may be required in such a case. The contact of the aqueous medium with the crystalline sodium sesquisulfate may be effected in any desired manner which achieves efficient liquid-solid contact, such as by stirring in a tank or passing countercurrently through a column. In general, it is possible to attain higher acidity values of aqueous medium while still precipitating neutral sodium sulfate by employing higher temperatures for the metathesis process.

The aqueous medium containing sodium chlorate preferably contains about 2 to about 4 molar sodium chlorate. This range is preferred over the lower about 0.01 up to about 2 molar range, since the common ion effect of the sodium ions in suppressing neutral anhydrous sodium sulfate solubility is maximized while the range is preferred over the higher range from about 4 molar to about 7 molar, since losses of valuable sodium chlorate with the solid neutral anhydrous sodium sulfate are minimized.

An aqueous sodium chlorate solution brought into contact with the sodium sesquisulfate, which may be a diluted portion of the sodium chlorate feed to the chlorine dioxide generator, generally is neutral. As the metathesis conversion of the sodium sesquisulfate to neutral sodium sulfate occurs, acid is released into the aqueous medium and forms an acid medium containing sulfuric acid which has a total acid normality of up to about 6.5 normal.

The acid aqueous medium which results from the metathesis step is intended to be recycled to the chlorine dioxide generator, so as to employ in the chlorine dioxide generating process both the chlorate ion values and recovered acid values contained therein. However, it is also desirable to minimize both the amount of water returned to the generator, since this water must be evaporated in the generator to retain steady state conditions, and the amount of dissolved neutral sodium sulfate returned to the generator, since such recycled material must be recrystallized and refiltered. Accordingly, it is preferred to recover acid at higher normalities, by employing a weight ratio of water in the aqueous medium contacting the sodium sesquisulfate in this and the other embodiments of the invention generally varies from about 0.25:1 to about 1.4:1, preferably about 0.3:1 to about 0.5:1. Correspondingly, the weight ratio of sodium chlorate to sodium sesquisulfate generally varies from about 0.001:1 to about 1.5:1, preferably about 0.2:1 to about 0.6:1.

If the chlorate value of the acid aqueous medium which results from the metathesis step is low enough, the acid aqueous medium may be employed for other pulp mill purposes, such as tall oil acidification or lime mud neutralization.

In another embodiment of the invention, the crystalline sodium sesquisulfate may be treated with an aqueous medium and a small quantity of methanol, generally up to a weight ratio of about 0.15:1 of methanol per unit weight of sodium sesquisulfate. At these concentrations, the solubility of neutral anhydrous sodium sulfate is suppressed, but there is no necessity to effect stripping of any excess methanol, as is necessary in the aforementioned U.S. Pat. No. 4,325,934 where the preferred weight ratio of methanol to sodium sesquisulfate is indicated to be from 0.3 to 0.8:1. The methanol which remains in the aqueous phase after removal of solid phase neutral sodium sulfate can be used in the chlorine dioxide generator as the sole feed of methanol thereto or to supplement an existing methanol or hydrogen peroxide feed.

Methanol generally is employed in this embodiment of the invention only when sodium chlorate initially is absent from the aqueous contact medium or when concentrations of sodium chlorate towards the low end of the range recited above are present in the aqueous medium, since in the preferred chlorate concentration range, very fine crystals of anhydrous neutral sodium sulfate are formed which are very difficult to separate out and some sodium chlorate is coprecipitated.

The methanol employed in this embodiment of the invention may be provided, in part, by condensate (which may also contain formic acid) from the condenser used to condense steam from the chlorine dioxide product stream prior to dissolution of the chlorine dioxide in water to form an aqueous solution of chlorine dioxide for use in pulp mill bleaching. Inevitably in a methanol-based chlorine dioxide generating process of the type under consideration, some of the methanol reactant is flashed off from the reaction medium and is present in the condensate. By employing a portion of the condensate in the metathesis step, the methanol present in this condensate replaces methanol which otherwise would need to be purchased for use in the metathesis operation.

In a third embodiment, water alone is used as the metathesis medium. In this embodiment, it may be necessary to recycle a portion of the product acid medium for use as wash water to free the sodium sesquisulfate of entrained reaction medium, so as to minimize the additional evaporative load imposed on the chlorine dioxide generator by the water used in the metathesis step, when the latter is recycled to the chlorine dioxide generator. However, when the metathesis operation is effected in such a manner as to provide a product acid medium having an acid normality of about 5.5 to about 6.5, then such recycle is unnecessary and water present in the product acid medium does not impose a significant additional evaporative load on the chlorine dioxide generator when the acid medium is recycled thereto.

DESCRIPTION OF PREFERRED EMBODIMENTS

Figure 1:
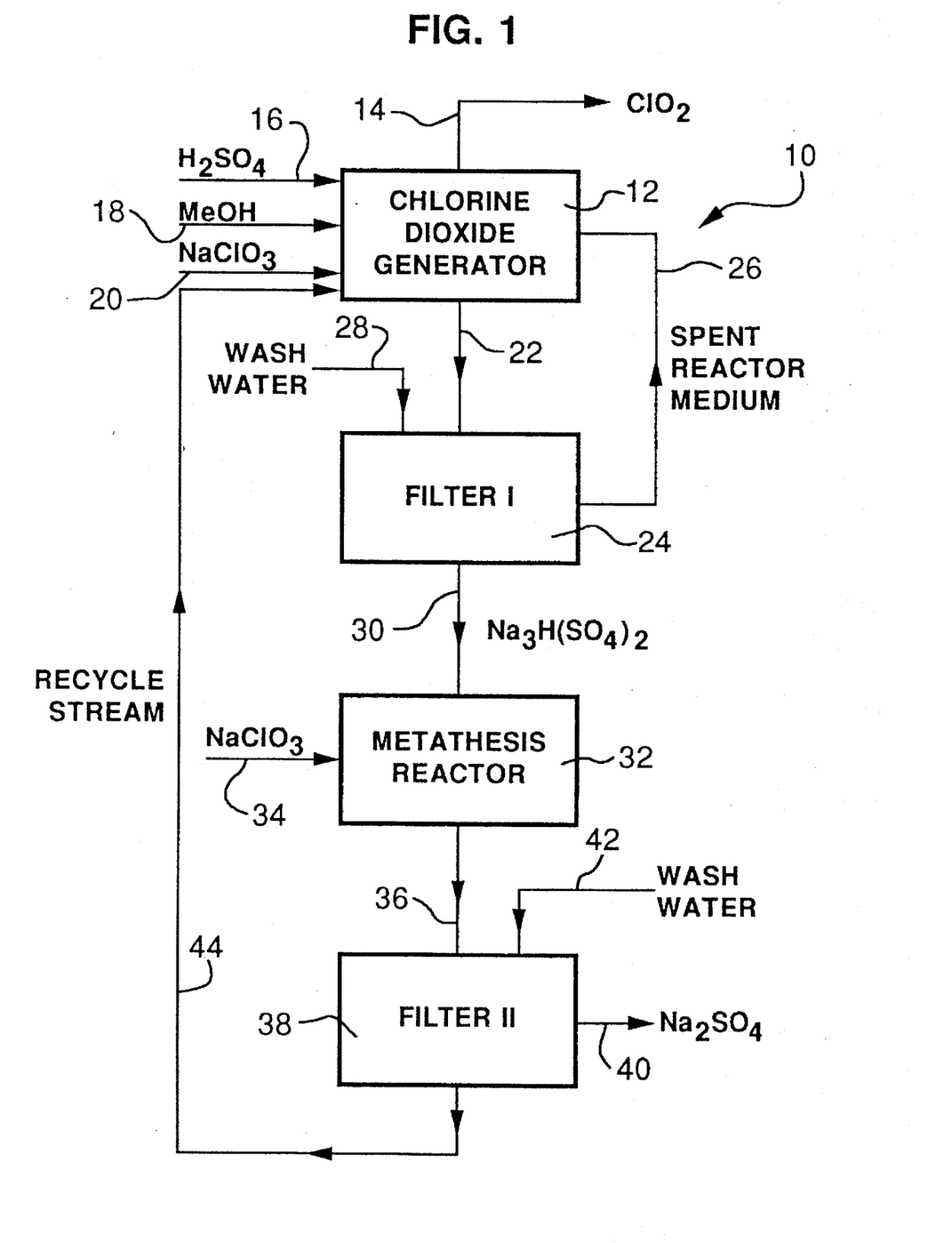
FIG. 1 is a schematic flow sheet of a chlorine dioxide generating process incorporating one embodiment of the present invention.

Referring first to FIG. 1, there is illustrated therein one embodiment of a chlorine dioxide generating unit 10 in accordance with the invention. As seen therein, a chlorine dioxide generator 12 produces chlorine dioxide, removed in gaseous admixture with steam via line 14. Feeds of sulfuric acid by line 16, methanol by line 18 and aqueous sodium chlorate solution by line 20 are made to the generator 12 to provide an aqueous acidic chlorine dioxide-generating reaction medium therein which is maintained at its boiling point under a subatmospheric pressure applied thereto. The methanol feed in line 14 may be replaced by a feed of hydrogen peroxide.

Crystalline sodium sesquisulfate is precipitated from the reaction medium and is removed in slurry form by line 22 to a first filter 24 wherein the crystalline material is separated from spent reaction medium, which is recycled by line 26 to the chlorine dioxide generator 12. Wash water to assist in separating the crystalline material from entrained reaction medium may be fed to the filter by line 28.

The washed crystalline sodium sesquisulfate is forwarded from the filter 24 by line 30 to a metathesis reactor 32, which preferably takes the form of one or more stirred tanks. To the metathesis reactor 32 is fed an aqueous sodium chlorate solution by line 34 of sufficient concentration and temperature to effect metathesis conversion of the crystalline sodium sesquisulfate to crystalline anhydrous neutral sodium sulfate, with release of acid into the sodium chlorate solution. The resulting slurry is forwarded by line 36 to a second filter 38 for separation of the solid phase sodium sulfate, which is recovered as a product by line 40.

Wash water may be fed by line 42 to the filter 38 to assist in freeing the solid phase from entrained sodium chlorate-containing liquid. The filtrate, containing sodium chlorate, sulfuric acid and dissolved sodium sulfate is recycled by line 44 to the chlorine dioxide generator 12. If desired, a portion of stream 44 may be recycled and used as at least part of the wash water feed in line 28 to the filter 24, to minimize the additional volume of water fed to the generator 12.

The sodium sulfate present in the recycle stream in line 44 is a deadload and cycles within the system, so that, under steady state conditions, the quantity of neutral anhydrous sodium sulfate removed in the product stream in line 40 is equivalent to the quantity of sodium sesquisulfate produced in the generator 12 at any given time.

The sodium chlorate and sulfuric acid present in the recycle stream provide a portion of the feed requirements of the chlorine dioxide generator 12 and the amounts of such chemicals fed by lines 20 and 16 respectively may be decreased accordingly.

Figure 2:
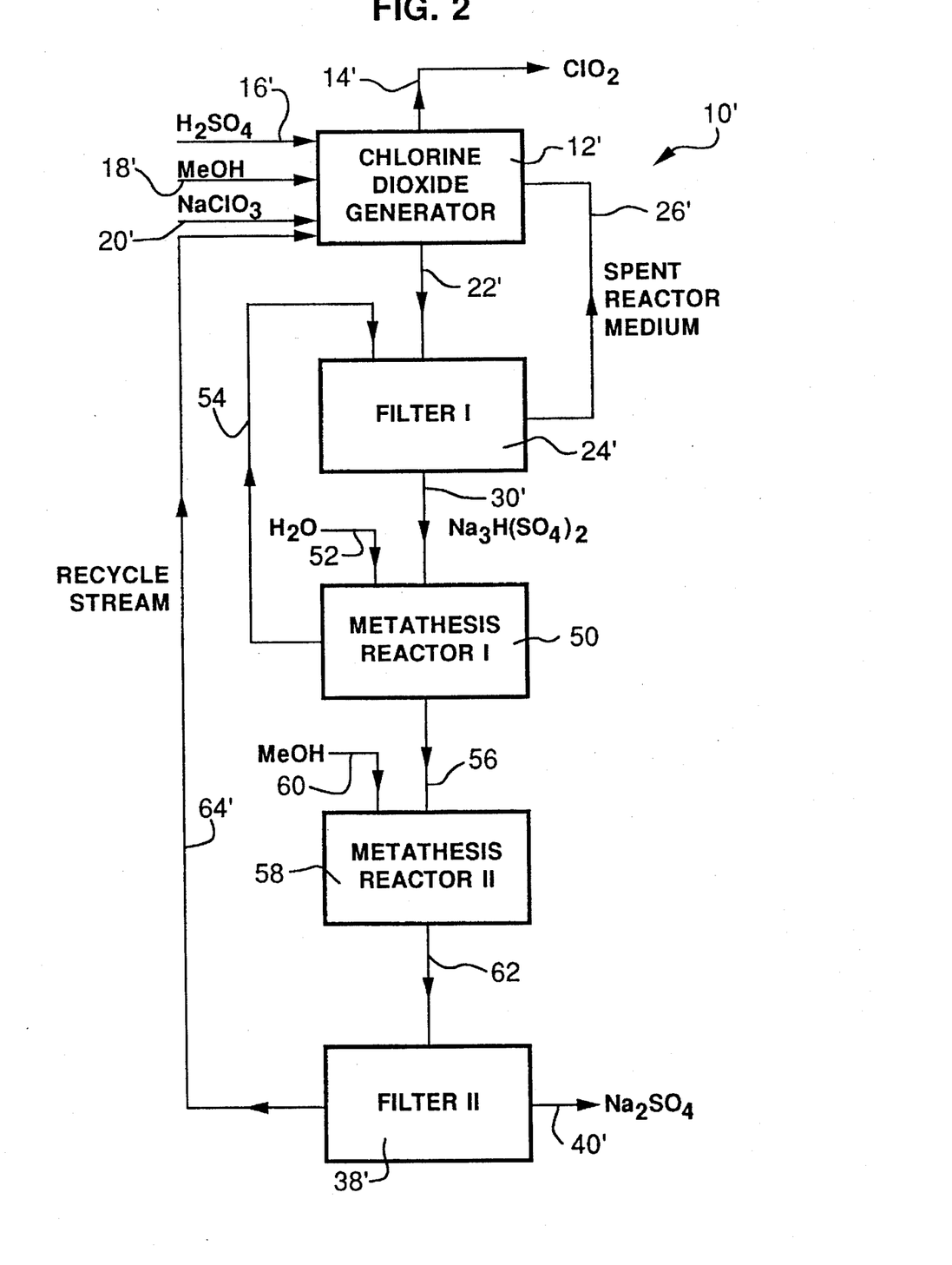
FIG. 2 is a schematic flow sheet of a chlorine dioxide generating process incorporating a second embodiment of the invention.

Referring now to FIG. 2, there is illustrated thereon a second embodiment of a chlorine dioxide generating unit 10' in accordance with the invention. Elements of the arrangement which are in common with FIG. 1 have been designated by the same numerals primed.

The solid crystalline sodium sesquisulfate is forwarded by line 30' to a first metathesis reactor 50 in which the solid is contacted with water fed by line 52 at a temperature and such volume as to effect metathesis of the sodium sesquisulfate to form neutral anhydrous sodium sulfate. A portion of the liquid phase is recycled by line 54 to form wash water for the filter 24'.

The slurry of the remainder of the liquid phase and neutral sodium sulfate crystals is forwarded by line 56 to a second metathesis reactor 58 to which methanol is fed by line 60. The methanol causes further neutral anhydrous sodium sulfate to come out of solution. The resulting slurry is forwarded by line 62 to the filter 38' wherein product neutral anhydrous sodium sulfate is removed by line 40'.

The liquid filtrate contains sulfuric acid recovered from the sodium acid sulfate and the methanol fed by line 60. This aqueous stream is recycled by line 64 to the chlorine dioxide generator 12' to provide at least part of the methanol feed thereto and part of the acid feed thereto, with the quantities of reactants fed by lines 18' and 16' respectively being correspondingly decreased.

Figure 3:
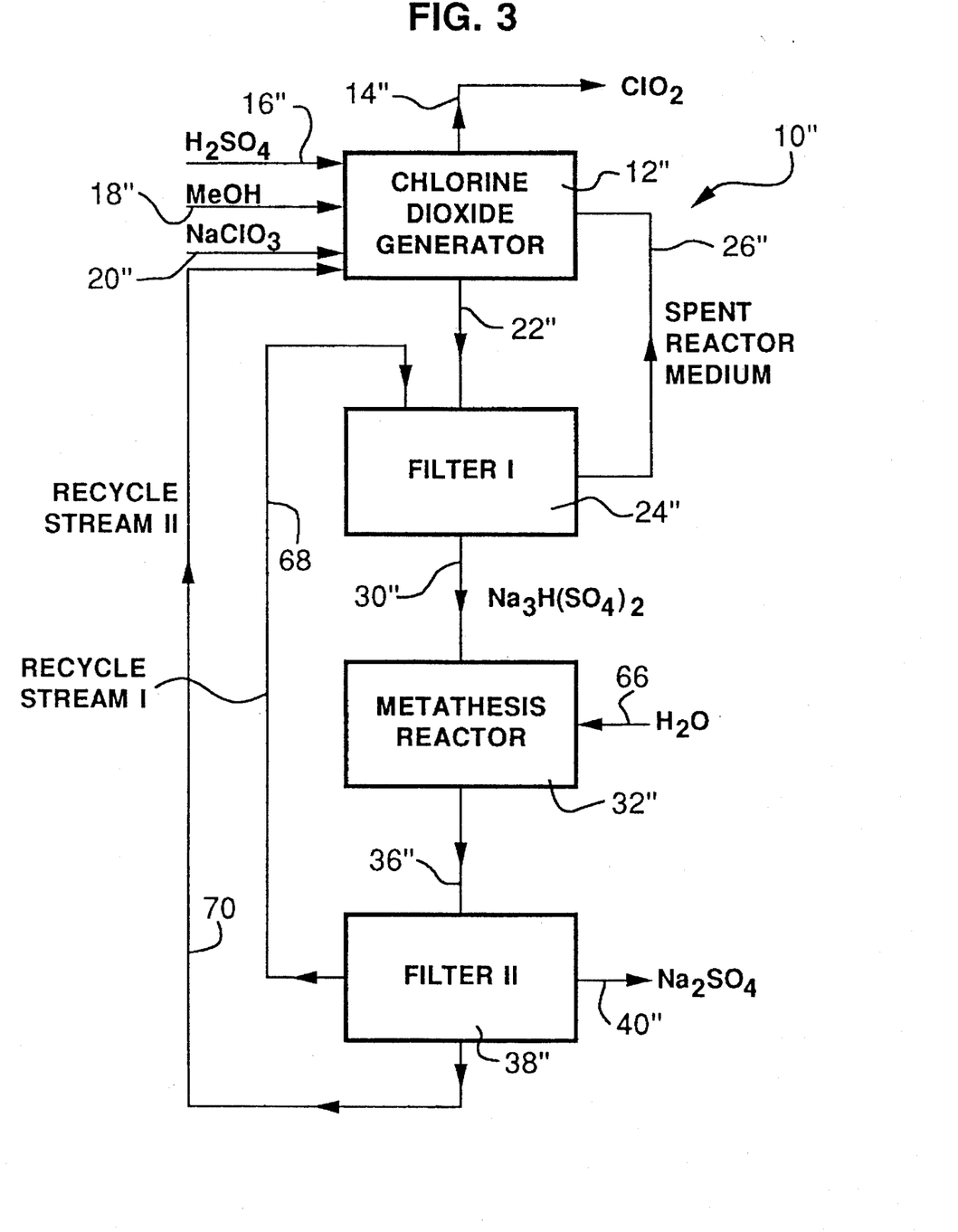
FIG. 3 is a schematic flow sheet of a chlorine dioxide generating process incorporating a third embodiment of the invention.

FIG. 3 illustrates a third embodiment of a chlorine dioxide generating unit 10" in accordance with the invention. Elements of the arrangement which are in common with FIG. 1 have been designated by the same numerals double primed.

In the metathesis reactor 32", the solid crystalline sodium sesquisulfate forwarded by line 30" is contacted with water in line 66 to effect metathesis of the sodium sesquisulfate to form neutral anhydrous sodium sulfate.

The resulting slurry is forwarded by line 36" to the second filter 38" wherein the crystalline anhydrous neutral sodium sulfate is separated and recovered as the product in line 40". Part of the filtrate from the second filter 38" may be recycled by line 68 to the first filter 24", so as to provide the wash water employed therein to free the sodium sesquisulfate from spent reaction medium.

The acidic filtrate not recycled by line 68 is recycled by line 70 to the chlorine dioxide generator 12" to provide acid values thereto. By splitting the filtrate from the second filter 38" into two recycle streams in this way, metathesis of sodium sesquisulfate using water alone can be effected without unduly increasing the evaporative load on the chlorine dioxide generator, when acid media of acid normality below 4.8 is formed. However, at higher acid normalities of the aqueous filtrate in the range of about 5.5 to about 6.5, all the filtrate may be recycled to the chlorine dioxide generator 12" without significantly increasing the evaporative load.

The acid filtrate which is recovered from the second filter 38", which is substantially free from sodium chlorate, may be employed for other pulp mill purposes, rather than being recycled by lines 68 and 70 to the filter 24" and generator 12" respectively. For example, the acid filtrate may be used in tall oil acidification or in lime mud neutralization.

EXAMPLES

Example I

This Example illustrates the effect of sodium chlorate concentration and sodium sesquisulfate loading on metathesis conversion.

A series of experiments was carried out wherein 300 mls of sodium chlorate solution was brought to a temperature of about 70° C. and a known quantity of dried sodium sesquisulfate was added. The mixture was maintained at 70° C., under agitation, for about 15 minutes. The mixture then was filtered and the resultant solids washed with about 15 ml of warm water. The solids and pre-rinse filtrate were analyzed for various parameters.

The results of representative experiments are set forth in the following Tables I and II, which show respectively, the effect of varying the sodium chlorate concentration on a fixed amount of sodium sesquisulfate and the effect of varying the sodium sesquisulfate concentration on a fixed amount of sodium chlorate:

TABLE I

EFFECT OF $NaClO_3$ CONCENTRATION

| $NaClO_3$ Conc. (N) | $Na_3H(SO_4)_2$ added (g) | Solids Yield (g) | Solids Acidity (wt % $H_2SO_4$) | Filtrate Acidity (N) | $NaClO_3$ Residue (wt %) |
|---|---|---|---|---|---|
| 3.5 | 157 | 32.6 | 0.0 | 1.85 | 1.42 |
| 4.0 | 157 | 28.8 | 0.0 | 1.61 | 1.30 |
| 5.0 | 157 | 52.3 | 1.29 | 1.52 | 7.41 |
| 6.0 | 157 | 75.3 | 0.0 | 1.76 | N/A |

TABLE II

EFFECT OF $Na_3H(SO_4)_2$ LOADING OF $NaClO_3$ SOLUTION

| $NaClO_3$ Conc. (N) | $Na_3H(SO_4)_2$ added (g) | Solids Yield (g) | Solids Acidity (wt % $H_2SO_4$) | Filtrate Acidity (N) | $NaClO_3$ Residue (wt %) |
|---|---|---|---|---|---|
| 3.0 | 314 | 178.8 | 0.0 | 2.96 | 3.68 |
| 3.0 | 471 | 182.4 | 0.0 | 4.25 | 0.62 |
| 3.0 | 498 | 209.5 | 0.0 | 4.29 | 0.68 |

All $Na_3H(SO_4)_2$ used was 17.9 wt % $H_2SO_4$.

As may be seen from Table I, as the sodium chlorate concentration decreased, so did the amount of residual sodium chlorate in the neutral sodium sulfate crystals. In addition, the yield of neutral sodium sulfate solids also was related to the sodium chlorate solution concentration, with the yield decreasing as the solute concentration decreased. In addition, the sodium chlorate solution concentration had no effect on residual acidity in the neutral sodium sulfate product, since, in the majority of cases, residual acidity was zero % irrespective of the sodium chlorate solution concentration.

As may be seen from Table II, for a fixed sodium chlorate solution concentration and volume, if the amount of sodium sesquisulfate added is increased, then the yield of neutral sodium sulfate increases along with the acidity of the filtrate.

As can be seen, acidity values up to 4.29N were obtained with no residual acidity in the neutral sodium sulfate.

Example II

This Example illustrates the effect of residence time on metathesis conversion.

Into 600 mls of water at 80° C., 1076 g of $Na_3H(SO_4)_2$ was added and the temperature adjusted to about 70° C. The slurry solution was sampled by taking approximately 50 ml aliquots at 2, 4, 6, 8 and finally 12 minutes. Each sample was filtered and the collected solids were rinsed in approximately 10 ml of warm water. The solids and pre-rinse filtrates were analyzed for various parameters.

The results are set forth in the following Table III:

TABLE III

RESIDENCE TIME RESULTS (BATCH RUNS WITH WATER)

| Run # | Sample Time (Minutes) | Filtrate Acidity (N) | Solids Acidity (wt % $H_2SO_4$) |
|---|---|---|---|
| 1 | 2.0 | 4.00 | 4.03 (Not rinsed) |
|   | 4.0 | 4.00 | 0.61 |
|   | 6.0 | 4.04 | 2.39 |
|   | 8.0 | 4.08 | 1.22 |
| 2 | 2.0 | 3.88 | 0.00 |
|   | 4.0 | / | 0.00 |
|   | 6.5 | 3.88 | 0.00 |
|   | 8.5 | 3.92 | 0.00 |
|   | 12.0 | / | 0.00 |

NOTE: Run #2 had better washing of filtered solid.

As may be seen from the results of Table III, the metathesis reaction was relatively fast, with a full filtrate acidity of approximately 4N being achieved from 2 minutes onwards, inferring that the conversion to neutral sodium sulfate had been completed. Some inconsistencies can be seen in the residual acidities but these were found to be the result of incomplete washing of the crystals.

Example III

This Example illustrates the effect of addition of methanol in the metathesis process.

Three different experiments were conducted, as follows:

(a) 300 ml of 3M sodium chlorate was heated to about 70° C. and 498 g of dry sodium sesquisulfate was added and the mixture was stirred at about 70° C. for about 15 minutes. The solution was filtered and the solids washed. 25 ml of 99.8% methanol was added to the pre-wash filtrate and the resultant precipitate was analyzed for chlorate.

(b) 600 ml of water at about 70° C. and 1076 g of sodium sesquisulfate (8% $H_2O$) were combined and mixed at about 70° C. for about 15 minutes. The pre-wash filtrate was added to a volume of methanol approximately three times its volume. The resultant precipitate was filtered and analyzed for acidity (without rinsing).

(c) Experiment (b) was repeated with 53.4 ml of 99.8% methanol added to the pre-filtrate; under mild agitation. The resultant precipitate was filtered (not washed) and analyzed for acidity.

The results of the three Experiments are set forth in the following Table IV:

TABLE IV

EFFECT OF METHANOL ON YIELD

| $Na_3H(SO_4)_2$ Added | $NaClO_3$ Conc. | Filtrate Vol. | $CH_3OH$ Added | Yield Orig/Final | Residual $NaClO_3$ | % Yield Incr. |
|---|---|---|---|---|---|---|
| 498 g | 3.0 M | 380 ml | 25 ml | 209 g/263 g | 7.9 w/w | +13.1 |
| 996 g | 0.0 M | 780 ml | 1.5 L | 200 g/460 g | 0.0 | +24.3 |
| 006 g | 0.0 M | 780 ml | 53.4 ml | 276 g/328 g | 0.0 | +5.9 |

NOTE: Based upon approx. 17.5 wt % $H_2SO4$ in sodium sesquisulfate, the maximum yield for the added amounts is
i) 498 g → 410.8 g $Na_2SO_4$
ii) 996 g → 821.7 g $Na_2SO_4$ As may be seen from the results of Table IV, the use of 3M $NaClO_3$ resulted in a precipitate containing a considerable concentration of sodium chlorate, forced out of solution along with the sodium sulfate. In addition, the neutral sodium sulfate crystals were very fine and took approximately one hour to settle.

The use of 50 ml of methanol (89 ml/L of filtrate) resulted in an additional approximately 6% yield over water use only. (i.e. 31.25 to 37.15%). The use of a large volume of methanol almost doubled the yield but resulted in a filtrate solution with a high methanol concentration, which would require separation.

Example IV

This Example illustrates the effect of the various metathesis schemes illustrated in FIGS. 1 to 3 on the evaporative load of the chlorine dioxide generator.

Based on the data presented in the above Examples, mass balances were prepared for the three embodiments of metathesis shown in FIGS. 1 to 3. These mass balances are set forth in the following Table V:

existing equipment, which would not be the case, if the evaporative load is increased by 3 to 4 t/t $ClO_2$. Using aqueous sodium chlorate solution decreases the evaporative load to around 1.78 t/t $ClO_2$, which value can be further decreased to 0.68 t/t $ClO_2$ by effecting recycle. Methanol and water metathesis provided an acceptable increased evaporative load of 1.2 t/t $ClO_2$ without the necessity to use methanol in an excess quantity that requires evaporative stripping prior to recycle.

Example V

This Example illustrates the effect of addition of sodium chloride concentration on metathesis conversion.

A series of experiments was carried out wherein 500 g of dried sodium sesquisulfate was added to 300 ml of water. Sodium chloride in varying quantities was added and the solution held and mixed at 70° C. for 5 minutes. The mixture then was filtered and the resultant solids washed with about 50 ml of warm water.

TABLE V

| | FIG. 1 | FIG. 2 | FIG. 3 |
|---|---|---|---|
| Filter Feed (sesqui) | 2766 Kg (22) | 2905 Kg (22') | 4288 Kg (22") |
| Wash Water-Filter I | 1100 Kg (28) | (none)[3] | (none)[4] |
| Solid Phase | 2766 Kg $Na_3H(SO_4)_2$ (30) | 2905 $Na_3H(SO_4)_2$ (30') | 4288 Kg $Na_3H(SO_4)$ (30") |
| Metathesis Feed | 1755 L of 3 M $NaClO_3$ (34) (1540 Kg $H_2O$, 561 Kg $NaClO_3$) | 1744 Kg $H_2O$ (52) 150 Kg $CH_3OH$ (60) | 2573 Kg $H_2O$ (66) |
| Wash water | 444 Kg (42) | (none) | (none) |
| Product ($Na_2SO_4$) | 1121 Kg (40) | 1100 Kg (40') | 1100 Kg (40") |
| Recycle to generator | 1984 Kg $H_2O$ (44) 561 Kg $NaClO_3$ 469 Kg $H_2SO_4$ 1170 Kg $Na_2SO_4$ | 1247 Kg $H_2O$ (64) 169 Kg $H_2SO_4$ 779 Kg $Na_2SO_4$ 150 Kg $CH_3OH$ | 3805 Kg (5) |
| Recycle to Filter I | (none)[1] | 497 Kg $H_2O$ 503 Kg $Na_2SO_4$ (606 sesqui) 325 Kg $H_2SO_4$ (222 free) | 1956 Kg[5] |
| Increased Evaporative Load | 1.78 t/t $ClO_2$[2] | 1.2 t/t $ClO_2$[2] | 2.03 t/t $ClO_2$[2] |

Notes:
1. If a portion of recycle stream is recycled and replaces the wash water feed in line 28, the increased evaporative load drops to 0.68 t/t $ClO_2$.
2. Normal evaporative load is approximately 4 t/t $ClO_2$ with design of 5 to 6 to allow for catch-up.
3. 1325 Kg of wash water is provided by recycle stream (54).
4. 1956 Kg of wash water is provided by recycle stream (68).
5. Each of these streams comprised 37.5 wt % $H_2O$, 38.0 wt % $Na_2SO_4$ and 24.5 wt % $H_2SO_4$.

As may be seen from this Table, metathesis using water increased the evaporative load by approximately 2 tonnes/tonne of chlorine dioxide generated, well below the increased load imposed by the prior art metathesis processes using water alone and within the range of current design loads. This result is important since it is unnecessary to provide a higher capacity reboiler or condenser than in the The results obtained are set forth in Table VI below:

TABLE VI

| Mol/L NaCl Added | Total Yield Na$_2$SO$_4$ | Total NaCl Precip. | Wt % NaCl in Solids |
|---|---|---|---|
| 0 | 209 g | — | — |
| 2 | 219.8 g | 0.26 g | 0.12 |
| 3 | 236.9 g | 0.97 g | 0.41 |
| 4 | 242 g | 1.06 g | 0.44 |
| 5 | 244 g | 4.68 g | 1.92 |

As may be seen from this data, an increased yield of neutral anhydrous sodium sulfate is obtained in the presence of added sodium chloride and the yield generally increased with increasing concentrations of sodium chloride. Significant contamination of product by sodium chloride was only experienced at high sodium chloride concentrations.

Example VI

This Example illustrates the results of further tests of metathesis with water but on a plant scale rather than a laboratory scale.

A 50 MTPD ClO$_2$ plant having a flow sheet resembling FIG. 3 was operated continuously. The acidity in the reactor 32" was found to be as high as 5.5N at 40° C. while still obtaining neutral anhydrous sodium sulfate (Na$_2$SO$_4$) in line 40" from filter 38". The sodium sulfate had less than 1% H$_2$SO$_4$ content.

Example VII

The results obtained in Example VI were simulated on a lab scale. The results from this simulation are set forth in the following Table VII:

TABLE VII

| Total Weight Na$_3$(HSO$_4$)$_2$ g | Total Water Added g | Acid Noramlity of Aqueous Phase N | Metathesis Efficiency* % |
|---|---|---|---|
| 312 | 139 | 5.5 | 94.3 |
| 300 | 150 | 5.28 | 99.2 |
| 291 | 160 | 4.91 | 99.4 |

*Metathesis efficiency is the percentage of recovered acid in relationship to total acid present in aqueous and solid phase.

Example VIII

This Example illustrates the results of further tests of metathesis with water.

Further laboratory experiments were carried out at a variety of temperatures in an attempt to establish a maximum acidity level which could be attained. The results obtained are set forth in the following Table VIII and the accompanying FIG. 4.

TABLE VIII

Maximum Acidities Obtained in the Metathesis of Sodium Sesquisulphate from 40 to 90° C.

| Temperature (°C.) | Total Amount of Na$_2$H(SO$_4$)$_2$ (g) | Acidity Liquor [H+] (N) | Acidity Solids (% H$_2$SO$_4$) |
|---|---|---|---|
| 40 | 715 | 5.2 | 0.07 |
|  | 865 | 5.2 | 0.49 |
| 50 | 805 | 5.6 | 0.05 |
|  | 1160 | 5.6 | 0.46 |
| 60 | 820 | 5.8 | 0.10 |
|  | 1210 | 5.8 | 1.26 |
| 70 | 600 | 6.0 | 0.08 |
|  | 652 | 6.0 | 0.18 |
| 80 | 750 | 6.2 | 0.10 |
|  | 800 | 6.3 | 1.46 |
| 90 | 855 | 6.4 | 28.3 |

Figure 4:
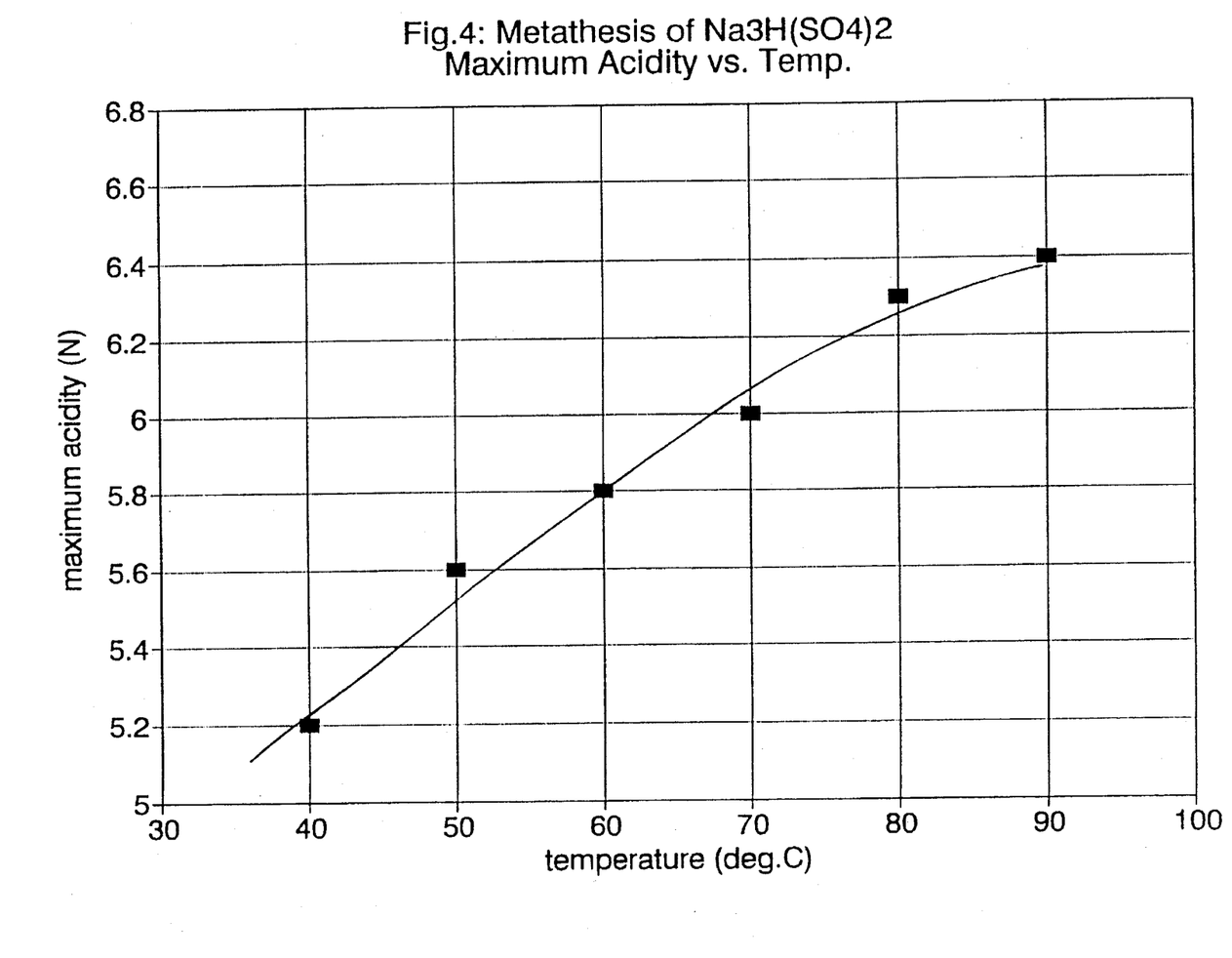
FIG. 4 is a graphical representation of the relationship of acidity attained from metathesis experiments with water carried out over a range of temperatures and as described below in Example VII.

The trend in increasing maximum acidity with increasing temperature may be seen in FIG. 4.

The results of Table VIII were attained by adding an initial load of 500 g sodium sesquisulfate to 300 g water and then under the prevailing conditions, adding additional sodium sesquisulfate in small increments of 10 to 50 g until the acidity of the liquid no longer increased.

As may be seen from these results acidities up to 6.4N could be attained at higher temperatures, while still producing solid neutral anhydrous sodium sulfate. Acidities greater than 5N were allowed over the range of temperatures of 40° to 90° C. tested and water ratios as low as 0.25 H$_2$O:1 Na$_3$H(SO$_4$)$_2$ w/w were employed at the highest acidity level.

Example IX

Figure 5:
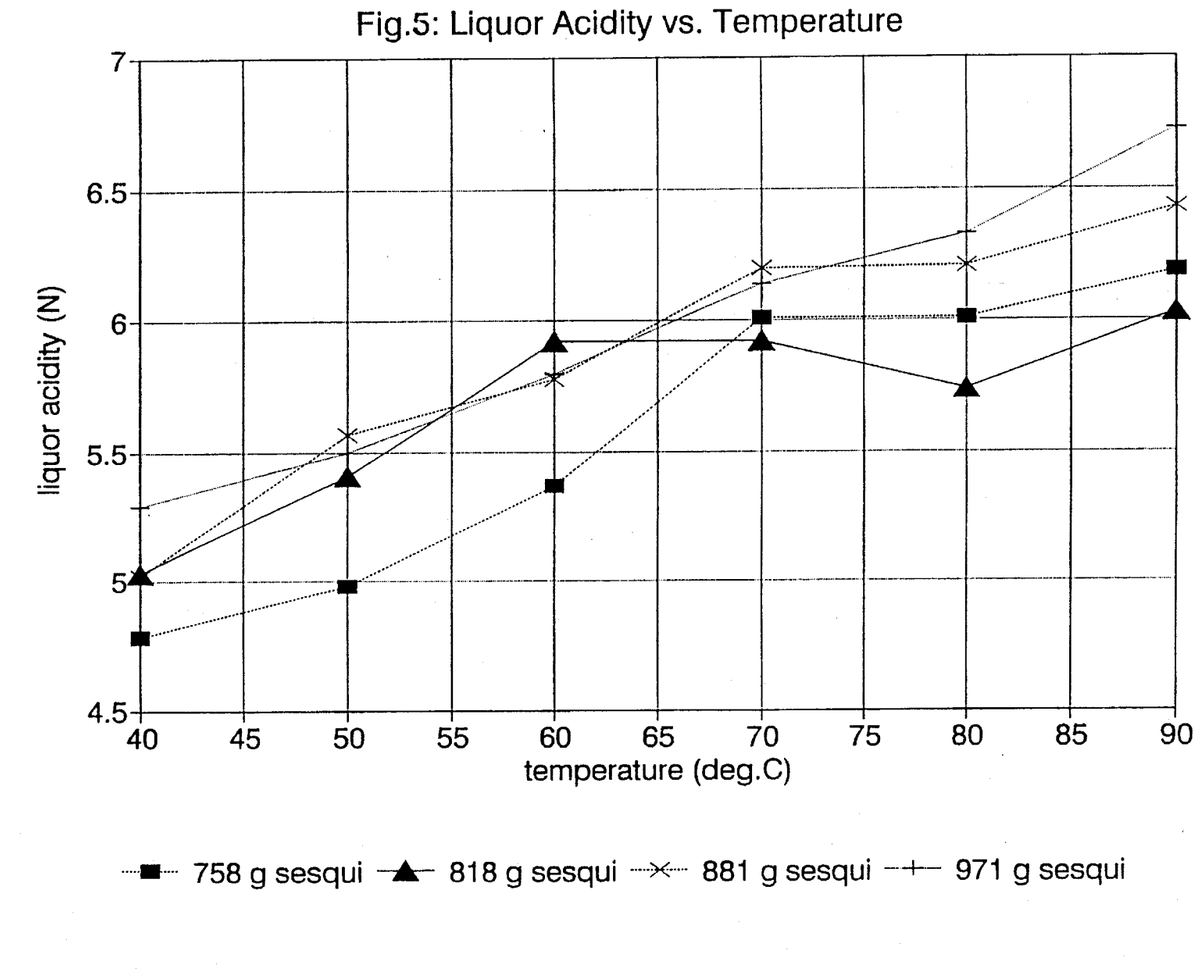
FIG. 5 is a graphical representation of the relationships of temperature and acidity attained from metathesis experiments carried out with water and as described below in Example VIII.

A constant weight of sodium sesquisulfate was added to 300 g of water, stirred and maintained at constant temperature for 20 minutes. The liquid was sampled (free of crystals) and analyzed. The slurry was then heated 10° C. hotter and maintained at the higher temperatures for 20 minutes and then sampled again. The results obtained were plotted graphically as FIG. 5. As may be seen from this data, the acidity attained always rose as the temperature rose.

SUMMARY OF INVENTION

In summary of this disclosure, the present invention provides a novel procedure for achieving metathesis of sodium sesquisulfate using sodium chlorate to form neutral anhydrous sodium-sulfate. Modifications are possible within the scope of this invention.

What we claim is:

1. A process for the conversion of sodium sesquisulfate to neutral anhydrous sodium sulfate, which consists of:

contacting said sodium sesquisulfate in solid crystalline form with an aqueous medium consisting of about 0.01 to about 7 molar sodium chlorate for a time and at a temperature at least sufficient to effect conversion of said solid crystalline sodium sesquisulfate to neutral anhydrous sodium sulfate at least partially in solid crystalline form and to form an aqueous acid-containing medium having a total acid normality of up to about 6.5 normal.

2. The process of claim 1 wherein said aqueous medium contains from about 2 to about 4 molar sodium chlorate.

3. The process of claim 2 wherein said aqueous medium is substantially neutral.

4. The process of claim 2 wherein the weight ratio of said aqueous medium to sodium sesquisulfate is about 0.3:1 to about 0.5:1.

5. The process of claim 4 wherein the weight ratio of said sodium chlorate in said aqueous medium to sodium sesquisulfate is from about 0.2:1 to about 0.6:1.

6. The process of claim 1 wherein the weight ratio of said aqueous medium to said sodium sesquisulfate is about 0.25:1 to about 1.4:1.

7. The process of claim 6 wherein the weight ratio of said sodium chlorate in said aqueous medium to sodium sesquisulfate is from about 0.001 to about 1.5:1.

8. The process of claim 1 effected at a temperature of at least about 30° C.

9. The process of claim 8 wherein said temperature is from about 40° to about 100° C.

10. A process for the conversion of sodium sesquisulfate to neutral anhydrous sodium sulfate, which consists of:
   contacting said sodium sesquisulfate in solid crystalline form with an aqueous medium consisting of about 0.01 to about 5 molar sodium chloride for a time and at a temperature at least sufficient to effect conversion of said solid crystalline sodium sesquisulfate to neutral anhydrous sodium sulfate at least partially in solid crystalline form and to form an aqueous acid-containing medium having a total acid normality of up to about 6.5 normal.

11. The process of claim 10 wherein said aqueous medium contains from about 2 to about 4 molar sodium chloride.

12. The process of claim 11 wherein said aqueous medium is substantially neutral.

13. The process of claim 11 wherein the weight ratio of said aqueous medium to sodium sesquisulfate is about 0.3:1 to about 0.5:1.

14. The process of claim 13 wherein the weight ratio of said sodium chloride in said aqueous medium to sodium sesquisulfate is from about 0.2:1 to about 0.6:1.

15. The process of claim 10 wherein the weight ratio of said aqueous medium to said sodium sesquisulfate is about 0.25:1 to about 1.4:1.

16. The process of claim 15 wherein the weight ratio of said sodium chloride in said aqueous medium to sodium sesquisulfate is from about 0.001 to about 1.5:1.

17. The process of claim 10 effected at a temperature of at least about 30° C.

18. The process of claim 17 wherein said temperature is from about 40° to about 100° C.

19. A process for the conversion of sodium sesquisulfate to neutral anhydrous sodium sulfate, which consists of:
   contacting said sodium sesquisulfate in solid form with an aqueous metathesizing medium for a time and at a temperature at least sufficient to effect conversion of said solid crystalline sodium sesquisulfate to neutral anhydrous sodium sulfate at least partially in solid crystalline form and to form an aqueous acid-containing medium having a total acid normality greater than about 4.8 normal, said aqueous metathesizing medium being selected from:
   (a) an aqueous medium consisting essentially of about 0.1 to about 7 molar sodium chlorate, and
   (b) an aqueous medium consisting essentially of about 0.01 to about 5 molar sodium chloride.

20. The process of claim 19 wherein said aqueous acid-containing medium has a total acid normality up to about 6.5 normal.

21. The process of claim 20 wherein said acid normality is about 5.5 to about 6.5N.

22. The process of claim 19 wherein the ratio of water in the aqueous metathesizing medium to sodium sesquisulfate is less than about 0.5:1.

23. The process of claim 22 wherein the ratio of water to sodium sesquisulfate is from about 0.25:1 to about 0.5:1.

24. The process of claim 19 which is effected at a temperature of about 40° to about 100° C.

25. A process for the production of chlorine dioxide, which consists of:
   reducing chlorate ion in an aqueous acid medium having a total acid normality of at least about 4 normal and containing sulfuric acid to form chlorine dioxide in a reaction zone from said aqueous acid reaction medium,
   maintaining said aqueous acid reaction medium at its boiling point under a subatmospheric pressure applied to said reaction zone and precipitating a by-product acid sulfate in said reaction zone from said aqueous acid reaction medium,
   removing said precipitated by-product acid sulfate from said reaction zone,
   contacting said removed by-product acid sulfate in the solid phase with an aqueous metathesizing medium for a time and at a temperature at least sufficient to effect conversion of said solid phase by-product acid sulfate to neutral anhydrous sulfate at least partially in solid crystalline form and to form an aqueous medium having a total acid normality greater than about 4.8 normal,
   separating said solid phase neutral anhydrous sulfate from said aqueous acid medium, and
   recycling said aqueous acid medium to said reaction zone, wherein said aqueous metathesizing medium is selected from:
   (a) an aqueous medium consisting essentially of about 0.01 to about 7 molar sodium chlorate, and
   (b) an aqueous medium consisting essentially of about 0.01 to about 5 molar sodium chloride.

26. The process of claim 25 wherein said aqueous acid-containing medium has a total acid normality up to about 6.5 normal.

27. The process of claim 26 wherein said acid normality is about 5.5 to about 6.5N.

28. The process of claim 25 wherein said solid by-product acid sulfate is sodium sesquisulfate and the ratio of water in the aqueous metathesizing medium to sodium sesquisulfate is less than about 0.5:1.

29. The process of claim 28 wherein said solid by-product acid sulfate is sodium sesquisulfate and the ratio of water to sodium sesquisulfate is from about 0.25:1 to about 0.5:1.

30. The process of claim 25 wherein said aqueous acid reaction medium producing chlorine dioxide has a total acid normality of about 5 to about 11 normal.

31. The process of claim 30 wherein said reduction is effected using methanol.

32. The process of claim 30 wherein said reduction is effected using hydrogen peroxide.

33. A process for the production of chlorine dioxide, which consists of:
   reducing chlorate ions in an aqueous acid reaction medium having a total acid normality of at least about 4 normal and containing sulfuric acid to form chlorine dioxide in a reaction zone from said aqueous acid reaction medium,
   maintaining said aqueous acid reaction medium at its boiling point under a subatmospheric pressure applied to said reaction zone and precipitating a by-product acid sulfate in said reaction zone from said aqueous acid reaction medium, removing said precipitated by-product acid sulfate from said reaction zone, contacting said removed by-product acid sulfate in the solid phase with an aqueous medium consisting essentially of from about 0.01 to about 7 molar sodium chlorate to effect conversion of said solid phase by-product acid sulfate into solid phase neutral anhydrous sulfate and to form an aqueous acid medium having a total acid normality up to about 6.5 normal, and separating said solid phase neutral anhydrous sulfate from said aqueous acid medium.

34. The process of claim 33 wherein said aqueous acid reaction medium producing chlorine dioxide has a total acid normality of about 5 to about 11 normal.

35. The process of claim 34 wherein said reduction is effected using methanol.

36. The process of claim 35 wherein said aqueous medium is substantially neutral.

37. The process of claim 34 wherein said reduction is effected using hydrogen peroxide.

38. The process of claim 33 wherein said aqueous medium contains from about 2 to about 4 molar sodium chlorate.

39. The process of claim 33 wherein said solid phase by-product acid sulfate is sodium sesquisulfate and the weight ratio of said aqueous medium to said sodium sesquisulfate in said contacting step is about 0.25:1 to about 1.4:1.

40. The process of claim 39 wherein the weight ratio of said sodium chlorate in said aqueous medium to said sodium sesquisulfate in said contacting step is about 0.001 to about 1.5:1.

41. The process of claim 39 wherein the weight ratio of said aqueous medium to said sodium sesquisulfate in said contacting step is about 0.3:1 to about 0.5:1.

42. The process of claim 41 wherein the weight ratio of said sodium chlorate in said aqueous medium to said sodium sesquisulfate in said contacting step is about 0.2:1 to about 0.6:1.

43. The process of claim 33 wherein said contacting step is effected at a temperature of at least about 30° C.

44. The process of claim 43 wherein said temperature is about 40° to about 100° C.

45. A process for the production of chlorine dioxide, which consists of:

reducing chlorate ions in an aqueous acid reaction medium having a total acid normality of at least about 4 normal and containing sulfuric acid to form chlorine dioxide in a reaction zone from said aqueous acid reaction medium, maintaining said aqueous acid reaction medium at its boiling point under a subatmospheric pressure applied to said reaction zone and precipitating a by-product acid sulfate in said reaction zone from said aqueous acid reaction medium, removing said precipitated by-product acid sulfate from said reaction zone having said aqueous acid reaction medium entrained therein, washing said removed by-product acid sulfate substantially free from said entrained reaction medium, contacting the resulting washed by-product acid sulfate in the solid phase with an aqueous medium consisting essentially of from about 0.01 to about 7 molar sodium chlorate to effect conversion of said solid phase by-product acid sulfate into solid phase neutral anhydrous sulfate and to form an aqueous acid medium having a total acid normality up to about 6.5 normal, and washing said solid phase neutral anhydrous sulfate free from entrained aqueous acid medium.

46. The process of claim 45 wherein a portion of said aqueous acid medium containing wash water used to wash said solid phase neutral anhydrous sulfate is recycled for use as wash water in said washing of said removed by-product acid sulfate.

47. The process of claim 45 wherein said washing of said removed by-product acid sulfate and of said solid phase neutral anhydrous sulfate is effected on separate filters.

48. The process of claim 47 wherein said contacting step is effected in a mixing tank.

49. A process for the production of chlorine dioxide, which consists essentially of:

reducing chlorate ions in an aqueous acid reaction medium having a total acid normality of at least about 4 normal and containing sulfuric acid to form chlorine dioxide in a reaction zone from said aqueous acid reaction medium, maintaining said aqueous acid reaction medium at its boiling point under a subatmospheric pressure applied to said reaction zone and precipitating a by-product acid sulfate in said reaction zone from said aqueous said reaction medium, removing said precipitated by-product acid sulfate from said reaction zone, contacting said removed by-product acid sulfate in the solid phase with an aqueous medium consisting essentially of from about 0.01 to about 5 molar sodium chloride to effect conversion of said solid phase by-product acid sulfate into solid phase neutral anhydrous sulfate and to form an aqueous acid medium having a total acid normality up to about 6.5 normal, and separating said solid phase neutral anhydrous sulfate from said aqueous acid medium.

50. The process of claim 49 wherein:

said precipitated by-product acid sulfate is removed from said reaction zone having said aqueous acid reaction medium entrained therein, said removed by-product acid sulfate is washed substantially free from said entrained reaction medium and the resulting washed by-product acid sulfate is subjected to said contacting step, and said solid phase neutral anhydrous sulfate is washed free from entrained aqueous acid medium.

51. The process of claim 50 wherein a portion of said aqueous acid medium containing wash water used to wash said solid phase neutral anhydrous sulfate is recycled for use as wash water in said washing of said removed by-product acid sulfate.

52. The process of claim 50 wherein said washing of said removed by-product acid sulfate and of said solid phase neutral anhydrous sulfate is effected on separate filters.

53. The process of claim 52 wherein said contacting step is effected in a mixing tank.

54. The process of claim 49 wherein aqueous acid reaction medium producing chlorine dioxide has a total acid normality of about 5 to about 11 normal.

55. The process of claim 54 wherein said reduction is effected using methanol.

56. The process of claim 54 wherein said reduction is effected using hydrogen peroxide.

57. The process of claim 49 wherein said aqueous medium contains from about 2 to about 4 molar sodium chloride.

58. The process of claim 57 wherein said aqueous medium is substantially neutral.

59. The process of claim 49 wherein said solid phase by-product acid sulfate is sodium sesquisulfate and the weight ratio of said aqueous medium to said sodium sesquisulfate in said contacting step is about 0.25:1 to about 1.4:1.

60. The process of claim 59 wherein the weight ratio of said sodium chloride in said aqueous medium to said sodium sesquisulfate in said contacting step is about 0.001 to about 1.5:1.

61. The process of claim 59 wherein the weight ratio of said aqueous medium to said sodium sesquisulfate in said contacting step is about 0.3:1 to about 0.5:1.

62. The process of claim 61 wherein the weight ratio of said sodium chloride in said aqueous medium to said sodium sesquisulfate in said contacting step is about 0.2:1 to about 0.6:1.

63. The process of claim 49 wherein said contacting step is effected at a temperature of at least about 30° C.

64. The process of claim 63 wherein said temperature is about 40° to about 100° C.

65. The process of claim 49 wherein said aqueous acid medium is employed for pH control in a pulp mill bleach plant.

66. A process for the production of chlorine dioxide, which consists essentially of:

reducing sodium chlorate in an aqueous acid reaction medium having a total acid normality of at least about 4 normal and containing sulfuric acid to form chlorine dioxide in a reaction zone from said aqueous acid reaction medium, maintaining said aqueous acid reaction medium at its boiling point under a subatmospheric pressure applied to said reaction zone and precipitating by-product sodium sulfate in said reaction zone from said aqueous said reaction medium, removing said precipitated by-product sodium sesquisulfate from said reaction zone as a slurry having said aqueous acid reaction medium entrained therein, feeding said slurry to a first filter means wherein said removed by-product sodium sesquisulfate is separated from entrained aqueous acid reaction medium and is contacted with wash water to remove residual entrained reaction medium to provide separated solid crystalline sodium sesquisulfate.

contacting said separated solid crystalline sodium sesquisulfate in the solid phase with water as the sole metathesizing medium in a mixing tank is a weight ratio of water to sodium sesquisulfate of about 0.3:1 to about 0.5:1 at a temperature of at least about 70° C. and for a time at least sufficient to effect at least about 94.3% conversion of said solid crystalline sodium sesquisulfate by metathesis into solid phase neutral anhydrous sodium sulfate and to form an aqueous acid medium having a total acid normality up to about 6.5 normal, separating said solid phase neutral anhydrous sodium sulfate from said reaction medium by filtration on a second filter means, and recycling at least part of said aqueous acid medium to said aqueous acid reaction medium.

67. The process of claim 66 wherein aqueous acid reaction medium producing chlorine dioxide has a total acid normality of about 5 to about 11 normal.

68. The process of claim 67 wherein said reduction is effected using methanol.

69. The process of claim 67 wherein said reduction is effected using hydrogen peroxide.

70. The process of claim 66 wherein said temperature is about 40° to about 100° C.

71. The process of claim 66 wherein said aqueous acid medium has a total acid normality of about 5.5 to about 6.5N.

72. A process for the production of chlorine dioxide, which consists essentially of:

reducing sodium chlorate in an aqueous acid reaction medium having a total acid normality of at least about 4 normal and containing sulfuric acid to form chlorine dioxide in a reaction zone from said aqueous acid reaction medium, maintaining said aqueous acid reaction medium at its boiling point under a subatmospheric pressure applied to said reaction zone and precipitating by-product sodium sesquisulfate in said reaction zone from said aqueous said reaction medium, removing said precipitated by-product sodium sesquisulfate from said reaction zone as a slurry having said aqueous acid reaction medium entrained therein, feeding said slurry to a first filter means wherein said removed by-product sodium sesquisulfate is separated from entrained reaction medium and is contacted with wash water to remove entrained reaction medium to provide separated solid crystalline sodium sesquisulfate, contacting said separated solid crystalline sodium sesquisulfate in the solid phase with water as the sole metathesizing medium in a mixing tank in a weight ratio of water to sodium sesquisulfate of about 0.3:1 to about 0.5:1 at a temperature of at least about 70° C. and for a time at least sufficient to effect at least about 94.3% conversion of said crystalline sodium sesquisulfate by metathesis into solid phase neutral anhydrous sodium sulfate and to form an aqueous acid medium having a total acid normality up to about 6.5 normal, separating said solid phase neutral anhydrous sodium sulfate from said aqueous acid medium by filtration on a second filter means, recycling part of said aqueous acid medium to said first filter means to constitute wash water used therein, and recycling the remainder of said aqueous acid medium to said reaction zone.

73. The process of claim 72 wherein said remainder of said aqueous medium not recycled to the reaction zone but is used in a pulp mill as an acid medium.

74. A process for the production of chlorine dioxide, which consists essentially of:

reducing sodium chlorate in an aqueous acid reaction medium having a total acid normality of at least about 4 normal and containing sulfuric acid to form chlorine dioxide in a reaction zone from said aqueous acid reaction medium, maintaining said aqueous acid reaction medium at its boiling point under a subatmospheric pressure applied to said reaction zone and precipitating by-product sodium sesquisulfate in said reaction zone from said aqueous said reaction medium, removing said precipitated by-product sodium sulfate from said reaction zone as a slurry having said aqueous acid reaction medium entrained therein, feeding said slurry to a first filter means wherein said removed by-product sodium sesquisulfate is separated from entrained reaction medium and is contacted with wash water to remove entrained reaction medium to provide separated solid crystalline sodium sesquisulfate, contacting said separated solid crystalline sodium in the solid phase with water as the sole metathesizing medium in a mixing tank in a weight ratio of water to sodium sesquisulfate of about 0.3:1 to about 0.5:1 at a temperature of at least about 70° C. and for a time at least sufficient to effect at least about 94.3% conversion of said crystalline sodium sesquisulfate by metathesis into solid phase neutral anhydrous sodium sulfate and to form an aqueous acid medium having a total acid normality up to about 6.5 normal, separating said solid phase neutral anhydrous sulfate from said aqueous acid medium by filtration on a second filter means, mixing at least a portion of said separated solid phase neutral anhydrous sodium sulfate with sodium chlorate to form an aqueous solution containing the same, electrochemically acidifying the resulting aqueous solution while sodium ions are electrochemically removed, and forwarding the resulting acidified solution to said reaction zone to provide chlorate ion and hydrogen ion reactants to said aqueous acid reaction medium.

75. A process for the production of chlorine dioxide, which consists of:

reducing chlorate ions in an aqueous acid reaction medium having a total acid normality of at least about 4 normal and containing sulfuric acid to form chlorine dioxide in a reaction zone from said aqueous acid reaction medium, maintaining said aqueous acid reaction medium at its boiling point under a subatmospheric pressure applied to said reaction zone and precipitating a by-product acid sulfate in said reaction zone from said aqueous acid reaction medium, removing said precipitated by-product acid sulfate in the solid phase with an aqueous medium consisting essentially of from about 0.01 to about 7 molar sodium chlorate to effect conversion of said solid phase by-product acid sulfate into solid phase neutral anhydrous sulfate and to form an aqueous acid medium having a total acid normality up to about 6.5 normal, separating said solid phase neutral anhydrous sulfate from said aqueous acid medium, and recycling said aqueous acid medium to said reaction zone.

* * * * *